United States Patent
Burckhardt et al.

(10) Patent No.: US 8,001,328 B2
(45) Date of Patent: Aug. 16, 2011

(54) METHOD AND PROCESS FOR EXPEDITING THE RETURN OF LINE EXCLUSIVITY TO A GIVEN PROCESSOR THROUGH ENHANCED INTER-NODE COMMUNICATIONS

(75) Inventors: Sebastian C. Burckhardt, Sammamish, WA (US); Arthur J. O'Neill, Wappingers Falls, NY (US); Vesselina K. Papazova, Highland, NY (US); Craig R. Walters, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 870 days.

(21) Appl. No.: 12/021,378

(22) Filed: Jan. 29, 2008

(65) Prior Publication Data

US 2009/0193192 A1    Jul. 30, 2009

(51) Int. Cl.
G06F 12/00    (2006.01)
(52) U.S. Cl. ......... 711/124; 711/114; 711/119; 711/141
(58) Field of Classification Search ........................ None
See application file for complete search history.

(56) References Cited

U.S. PATENT DOCUMENTS

| | | | |
|---|---|---|---|
| 4,858,116 A | 8/1989 | Gillett et al. | |
| 4,941,083 A | 7/1990 | Gillett et al. | |
| 4,949,239 A | 8/1990 | Gillett et al. | |
| 6,226,718 B1 | 5/2001 | Carpenter et al. | |
| 6,480,918 B1 | 11/2002 | McKenney et al. | |
| 6,986,005 B2 | 1/2006 | Vo | |

OTHER PUBLICATIONS

H.N. Reddy; Decentralized Load Balancing Algorithm for Dynamic Computer Networks; IBM Techncal Disclosure Bulletin, No. 7a; Dec. 1991; pp. 221-223.

*Primary Examiner* — Shawn X Gu
(74) *Attorney, Agent, or Firm* — John E. Campbell; Daniel E. McConnell

(57) ABSTRACT

A method and apparatus in which the observability of cross-invalidates requests within remote nodes is controlled at the time of a partial response generation, when a remote request initially checks/snoops the directory state of the remote node, but before such the time that the cross-invalidate request is actually sent to the processors on a given node. If all of the remote nodes in the system indicate that the cross-invalidates could be sent during an initial directory snoop, the requesting node is able to return full exclusivity to a given cache line to a requesting processor at the time when it receives all of the partial responses, instead of having to wait for the final responses from each of the remote nodes within the system.

17 Claims, 3 Drawing Sheets

METHOD AND PROCESS FOR EXPEDITING THE RETURN OF LINE EXCLUSIVITY TO A GIVEN PROCESSOR THROUGH ENHANCED INTER-NODE COMMUNICATIONS

BACKGROUND OF THE INVENTION

1. Field of the Invention

This invention relates to computer system design and in particularly to multi-node coherency protocols and methods for expediting the establishment of system coherency.

2. Description of Background

If we examined a typical strong store ordered, symmetric multiprocessing computer system consisting of a plurality of nodes, interconnected through a given bus topology, with a bus protocol that exchanges address, data, and coherency information, we would normally observe that the return of full exclusive ownership of a line to a given processor for an exclusive fetch request does not occur until after a protracted series of communications is completed to ensure that all processors in the system have given up ownership to the requested line before the requesting core can modify the line.

This communication typically includes an initial address request launch from a requesting node to all target/remote nodes, which is primarily done in order to determine/snoop the remote cache directory states. At the same time as the remote directory lookups, the remote processors are typically notified that they must give up ownership of the line though a cross-invalidate request and an intermediate/partial response is typically sent back to the requesting node from each remote nodes, such that the requesting node is able to determine the overall system coherency for the given line. This information is then sent to each of the remote nodes as a combined response, in order to ensure that proper coherency handling of the lines on each remote cache is managed correctly. Finally after this response is received on each remote node and coherent handling of the line is completed, the remote nodes send a completion/final response back to the requesting node indicating that they have completed processing and reset. Upon receiving the completion response from all of the remote nodes, the requesting node returns exclusivity of the line to the requesting processor.

As a result of waiting for this coherency communication between a plurality of nodes, the requesting node can incur an indeterminate latency penalty, as the response time for all of the responses within a typical system vary depending on the type of activity within each remote node and the activity within a given processor, as the processor may reject the request for it to give up exclusive ownership a line any of a number of times if it is actively modifying the line.

SUMMARY OF THE INVENTION

The invention to be disclosed herein reduces this coherency latency through a method that expedites the return of line exclusivity to a given processor through enhanced inter-node communications.

This improvement in communications is designed to increase the observability of the cross-invalidates requests within the remote nodes at the time of the partial response generation, when a remote request initially checks/snoops the directory state of the remote node, but before such a time as when the cross-invalidate request is actually sent to the processors on a given node. In this manner, if all of the remote nodes in the system indicate that the cross-invalidates could be sent during this initial directory snoop, the requesting node is able to return full exclusivity to a given line to a requesting processor at the time when it receives all of the partial responses, instead of having to wait for the final responses from each of the remote nodes within the system. This greatly reduces the latency penalty incurred during such types of requests, resulting in increased system performance.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the invention described here, we have achieved a technical solution which reduces system coherency latency and increases system performance within multi-node systems.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
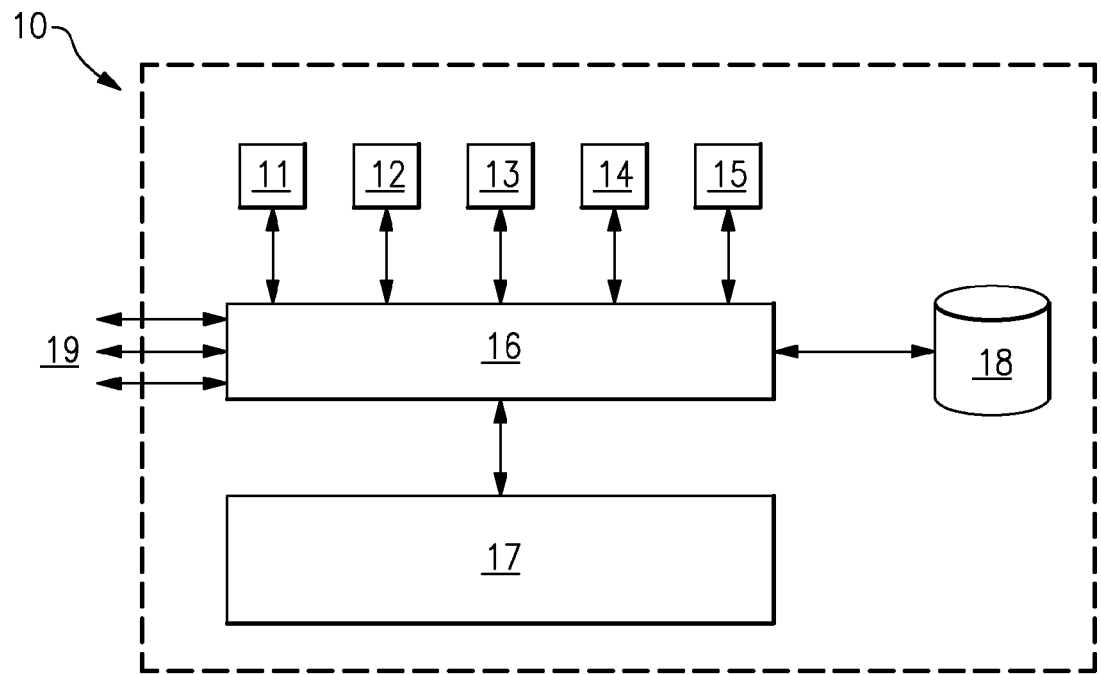
FIG. 1 illustrates the general contents of a node within the context of a multi-node system

Turning now to the drawings in greater detail, in FIG. 1. a node containing a symmetric multiprocessing computer system, 10, can be seen consisting of a plurality of processors with associated cache and directory, 11-15, interconnected by a shared level of cache with associated directory, 16, with storage shared amongst the systems processors, 17, and common I/O devices, 18, interconnected to other nodes within a multi-node system through a plurality of interconnect buses, 19.

A fetch request targeting a given line entering the system can be initiated by any of the plurality of processors, 11-15, that upon missing the processors private cache will traverse the system in search of a target line address and associated data. Upon such a miss, the request will initially enter the shared level of cache, 16, and access the cache's directory to determine if the target line exists in that level of cache. If the line exists in the shared level of cache, commonly referred to as a directory hit, the processors request will potentially be satisfied and the target lines data will be returned to the requesting processor. If a directory miss is encountered or the line exists in the shared level of cache but in a state that does not satisfy the processors request, i.e. a read-only hit when the fetch request is for exclusivity, a request will be launched to either the remote nodes through the multi-node interconnect buses, 19, or to the node's locally attached shared storage 17.

Figure 2:
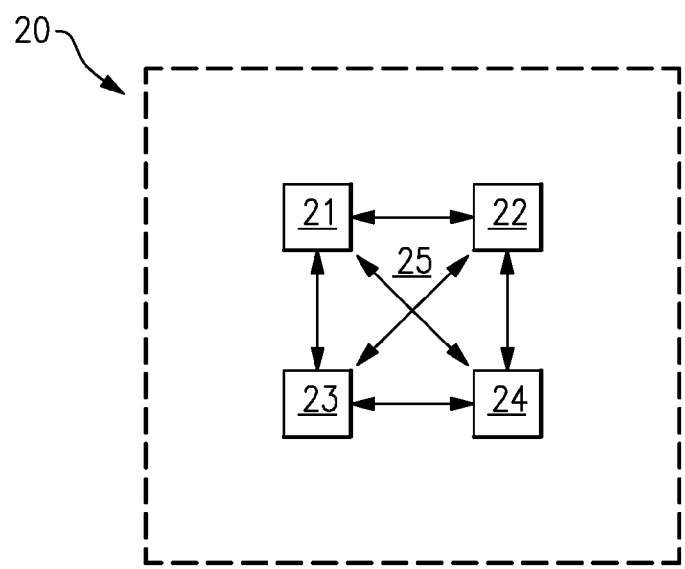
FIG. 2 illustrates a general multi-node system
Figure 3:
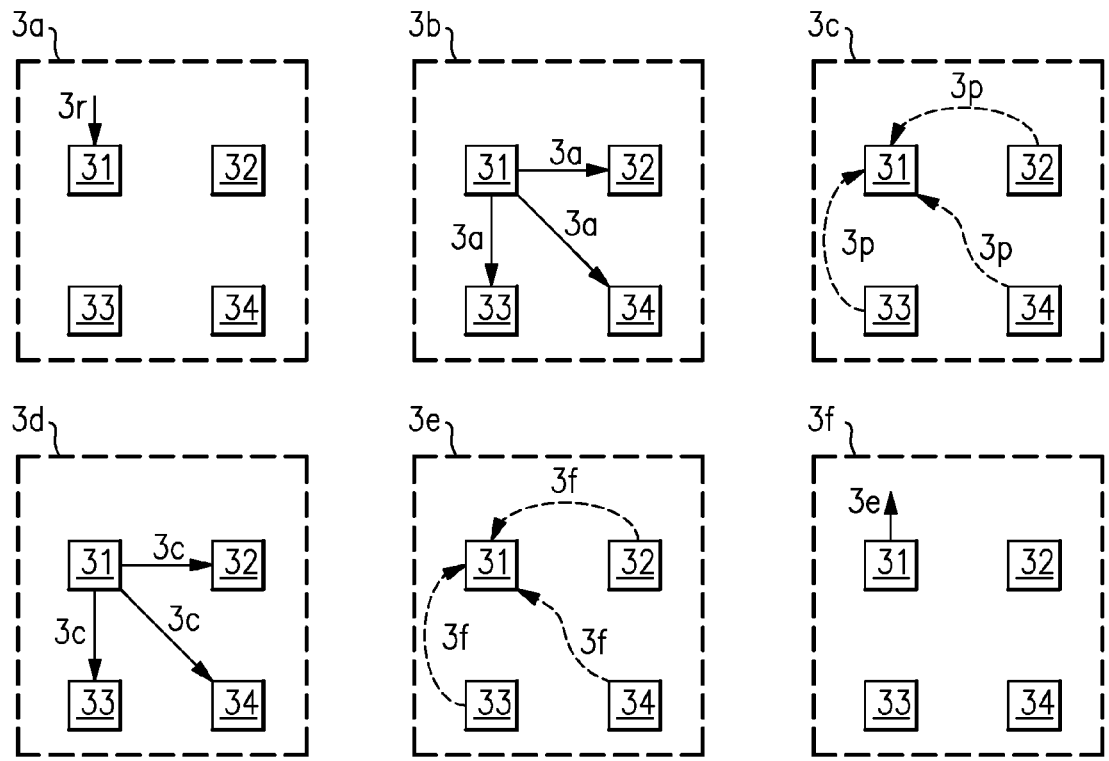
FIG. 3 illustrates a fully connected multi-node coherency protocol

In the case of a request being launched to the remote node, we will assume a fully connected system topology, 20, as shown in FIG. 2, consisting of a plurality of interconnect buses, 25, connecting a multitude of remote nodes, 21-24, which follow a given coherency protocol. Each remote node consists of the same devices as shown in FIG. 1, providing for a plethora of processors within the multi-node system, and a larger aggregate shared level of system cache.

Each node within the multi-node system will be assumed to follow a communications protocol consisting of the following elements as detailed in FIGS. 3a through 3f. An address broadcast, 3a, a set of partial responses, 3p, a set of combined responses, 3c, and a set of final responses, 3f, which always follow each other in the respective order of generation. An initial processor request, 3r, is sent to the shared level of cache in a local node, 31, of a multiple node data handling system 30. When this request encounters a local cache miss, the node initiates a request, 3a, to each of the remote nodes, commonly referred to as an address broadcast as this request broadcasts the requesting node's fetch command and address to each of the remote nodes in the system. Upon entering the remote node, the address broadcast will lookup the directory state of the remote cache to determine the state of the target line's address in the remote cache as well as potentially sending cross-invalidate requests to the remote processor's in order to ensure that they rescind ownership of the potentially contended line. Following such a directory search, each of the remote nodes will send a partial response, 3p, back to the requesting node with information indicating the state of the line in each of the remote caches, ranging from exclusive line hit, read only line hit, miss, etc. The requesting node then takes each of the partial responses and merges them into a combined response, 3c, which indicates the coherent state of the line in the system and broadcast this response to each of the remote nodes. Upon receiving the combined response, each of the remote nodes will then proceed to manage their local cache states to ensure that upon completing processing of their respective requests the state of the line within the system is coherently managed. When the coherent handling of the line within the respective remote node is completed, each remote node will send a final response, 3f, back to the requesting node. After receiving a final response from each of the remote nodes, the requesting node is then assured that system coherency has been obtained and exclusivity of the target line can be returned to the requesting processor, 3e.

Figure 4:
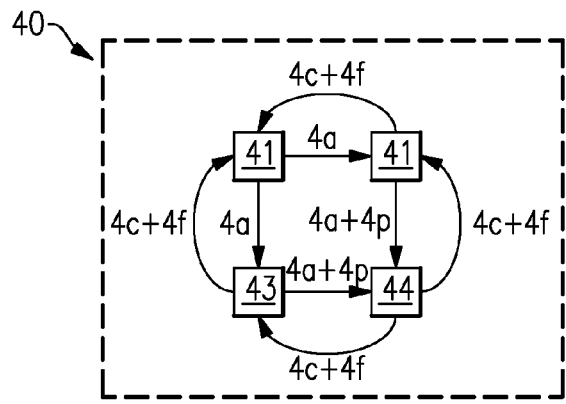
FIG. 4 illustrates a ring connected multi-node coherency protocol
Figure 5:
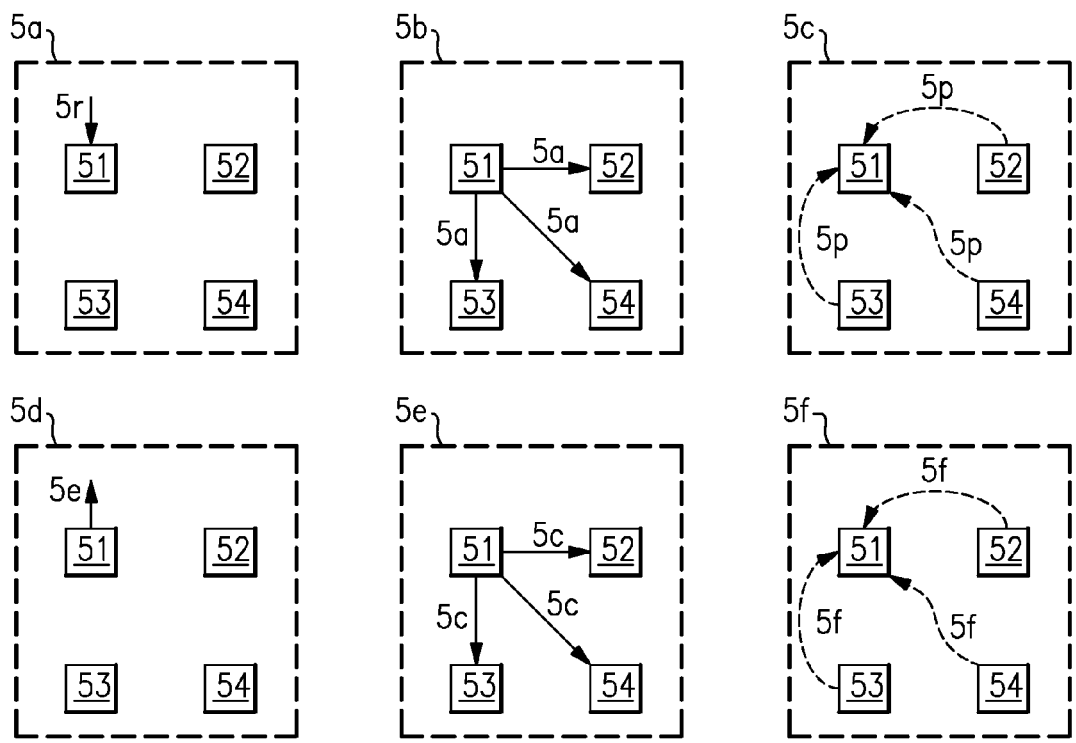
FIG. 5 illustrates the improved multi-node coherency protocol

The aforementioned multi-node coherency management algorithm/communications protocol provides a perspective on prior generation coherency management algorithms within the context of a fully connected system topology. In the case of a ring interconnect topology, as show in FIG. 4, a similar protocol can generally be observed, though the partial response, 3p, would be combined with the address broadcast, 4a+4p, when the request traverses an intermediate node, and the combined and final responses, 3c and 3f respectively, would be merged to form 4c+4f in sending the response from a diagonal node back towards the requesting node.

Now within the scope of either protocol, it can be observed historically that the latency penalty incurred before a line is returned in an exclusive state to a requesting processor is dependent on the observability of the final responses within the system. As until such a point is reached, there is no guarantee that all processors on all remote nodes have given up ownership of their remote copies of the line. This is particularly true of exclusively owned lines as a processor may be currently modifying the target line and will reject any cross-interrogate requests until such a point is reached that it is conducive for it to renege ownership.

Herein lays the target of this invention. A method to reduce the latency penalty incurred on exclusive fetch requests within the bounds of a multi-node system without violating a strong store ordered system coherency protocol.

Turning attention to FIGS. 5a through 5f, a protocol similar to that of FIGS. 3a through 3f is shown. Paying particular attention to the aforementioned multi-node system coherency protocol, it can be observed that the protocol is elegant in its generalization of request handling but leaves opportunity for improvement in the area of specialization of request handling. If we examined in particular the case of an exclusive fetch request that locates multiple copies of a given line within multiple shared caches within the system, the general system coherency protocol would follow the same process of communication in this case, as it would in the case where the same line was found exclusive within one cache in the system or in the case where the request missed all caches within the system and had to access the respective shared storage where the resident copy of the line would be stored.

If we assumed when an exclusive fetch request encounters a line in a read-only state and must notify the owning processors to give up ownership of the line through a cross-interrogate request, that the owning processors can not reject the cross-interrogate request as they are unable to be modifying the line and therefore must immediately halt processing use of the line, then we can make an assumption that as long as said cross-interrogate request can be sent to a given set of processors on a remote node, it can be guaranteed that the processors will give up ownership of the line in a fixed timely manner.

With the timeliness of honoring such cross-interrogate requests in mind and applying it to the aforementioned coherency management algorithm, a method for expediting the return of line exclusivity to the requesting processor can be attained by including the status of sending cross-interrogate requests to processors on a given remote node in the partial responses, 5p, of the management algorithm for the case of an exclusive type fetch hitting read-only in one or more remote caches in the system. By doing so, the requesting node gains an early observability of the state of all remote shared caches in the system and in the case where the requesting processor sends in an exclusive fetch, the remote shared caches have only read-only copies, and the cross-interrogates are able to be sent during the remote cache directory address lookup, then the requesting node is certain that by the time the partial responses are received from all of the remote nodes, processor ownership of the line(s) on the remote nodes have been reneged due to the fixed timing relationship between the cross-interrogate request launch and the requirement that remote processors honor such a request.

In this manner, exclusivity of the line is returned to the requesting processor at the time of the receipt of all partial responses, 5p, instead of at time of the final responses, 5f. This reduces the latency for responding to the requesting processor by the time required to communicate the combined response, 5c, to all of the remote nodes and for them to respond with the final responses, 5f, for an effective latency reduction of 5c+5f. In the case of a high-frequency system where inter-node round trip latencies can be measured on the same scale as the time required for data return in the case of a local shared cache data sourcing, the performance impact of such improvements to a system can be sizeable.

The capabilities of the present invention can be implemented in software, firmware, hardware or some combination thereof.

Figure 6:
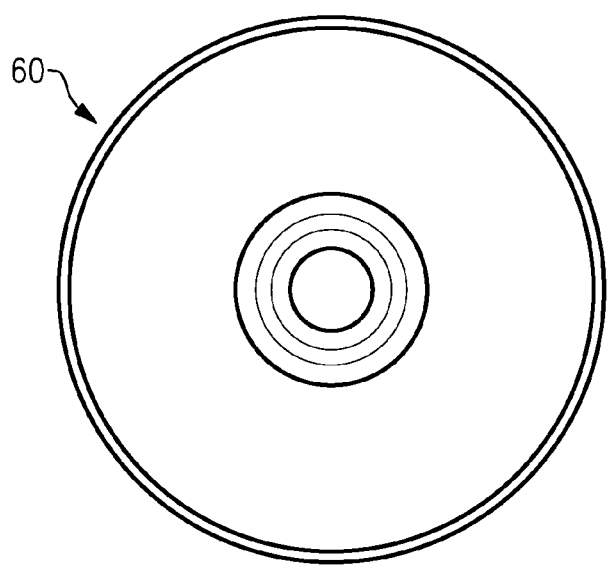
FIG. 6 illustrates one form of computer readable media bearing program code which executes on a multi-node data handling system to implement this invention The detailed description explains the preferred embodiments of the invention, together with advantages and features, by way of example with reference to the drawings.

As one example, one or more aspects of the present invention can be included in an article of manufacture (e.g., one or more computer program products) having, for instance, computer usable media 60 of FIG. 6. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. Method comprising:
    initiating a request for a cached line at a first node of a multi-node data handling system;
    responding to the cached line request by initiating from the first node cross-interrogate requests to other nodes of the multi-node data handling system; and
    responding to the cross-interrogate requests by initiating from each of the other nodes of the multi-node data handling system a partial response to the first node which indicates a status of the cross-interrogate request to the responding other node.

2. Method according to claim 1 further comprising:
    determining at the first node in response to receipt of the partial responses from the other nodes whether processor ownership of the requested cached line has been reneged at the other nodes.

3. Method according to claim 1 further comprising:
    determining at the first node in response to receipt of the partial responses from the other nodes whether processor ownership of the requested cached line has been reneged at the other nodes; and
    responding to a determination that processor ownership has been reneged by returning exclusivity of the requested cached line to a requesting processor; and
    responding to the cross-interrogate requests by initiating from each of the other nodes of the multi-node data handling system a final response to the first node which indicates a status of the cached line at the responding other node.

4. Method according to claim 3 wherein said initiated request for a cached line is for an exclusive fetch request.

5. Method according to claim 4 wherein the recited steps proceed seriatim.

6. Method according to claim 3 wherein the return of exclusivity precedes the final responses from the other nodes.

7. Method according to claim 1 wherein said initiated request for a cached line is for an exclusive fetch request.

8. A computer program product for expediting the establishment of system coherency in a multi-node data handling system, the computer program product, readable by a processing circuit and storing instructions for execution by the processing circuit for performing a method comprising:
    initiating a request for a cached line at a first node of the multi-node data handling system;
    responding to the cached line request by initiating from the first node cross-interrogate requests to other nodes of the multi-node data handling system;
    responding to the cross-interrogate requests by initiating from each of the other nodes of the multi-node data handling system a partial response to the first node which indicates a status of a cross-interrogate request to the responding other node; and
    determining at the first node in response to receipt of the partial responses from the other nodes whether processor ownership of the requested line has been reneged at the other nodes.

9. A computer program product according to claim 8 wherein the method comprises responding to a determination that processor ownership has been reneged by returning exclusivity of the requested cached line to a requesting processor.

10. A computer program product according to claim 8 wherein the method further comprises:
    responding to a determination that processor ownership has been reneged by returning exclusivity of the requested cached line to a requesting processor; and
    responding to the cross-interrogate requests by initiating from each of the other nodes of the multi-node data handling system a final response to the first node which indicates a status of the cached line at the responding other node.

11. A computer program product according to claim 10 wherein the return of exclusivity precedes the final responses from the other nodes.

12. A computer program product according to claim 8 wherein said initiated request for a cached line is for an exclusive fetch request.

13. Apparatus comprising:
    a multi-node data handling system;
    a first node of said data handling system which responds to a cached line request by initiating from the first node cross-interrogate requests to a plurality of other nodes of the multi-node data handling system; and
    each of the plurality of other nodes of said data handling system responding to a cross-interrogate request by initiating a partial response to the first node which indicates a status of the cross-interrogate request to a responding other node.

14. Apparatus according to claim 13 wherein said first node determines in response to receipt of the partial responses from the other nodes whether processor ownership of the requested line has been reneged at the other nodes and responds to a determination that processor ownership has been reneged by returning exclusivity of the requested cached line to a requesting processor.

15. Apparatus according to claim 13 wherein:
    said first node determines in response to receipt of the partial responses from the other nodes whether processor ownership of the requested line has been reneged at the other nodes and responding to a determination that processor ownership has been reneged by returning exclusivity of the requested cached line to a requesting processor; and said plurality of other nodes each respond to the cross-interrogate requests by initiating a final response to the first node which indicates a status of the cached line at the responding other node.

16. Apparatus according to claim 15 wherein the return of exclusivity precedes the final responses from the other nodes.

17. Apparatus according to claim 13 wherein said cache line request is for an exclusive fetch request.

* * * * *